United States Patent
Inaba

[11] Patent Number: 5,778,268
[45] Date of Patent: Jul. 7, 1998

[54] STEREO CAMERA

[76] Inventor: Minoru Inaba, No. 1116, Oaza Samukawa, Oyama-shi, Tochigi-ken, Japan

[21] Appl. No.: 695,626

[22] Filed: Aug. 12, 1996

[51] Int. Cl.$^6$ ............................................. G03B 35/00
[52] U.S. Cl. ................................... 396/326; 396/329
[58] Field of Search ........................... 396/322, 324, 396/326, 329

[56] References Cited

U.S. PATENT DOCUMENTS

| | | |
|---|---|---|
| 1,596,835 | 8/1926 | Hewson . |
| 1,871,281 | 8/1932 | Savage . |
| 2,458,466 | 1/1949 | Campbell . |
| 2,729,153 | 1/1956 | Heidecke . |
| 2,803,179 | 8/1957 | Donaldson . |
| 3,068,772 | 12/1962 | MacNeille . |
| 3,115,816 | 12/1963 | Muller . |
| 3,608,458 | 9/1971 | Ratliff, Jr. . |
| 3,687,031 | 8/1972 | Jahnsman . |
| 3,852,787 | 12/1974 | Nims et al. . |
| 3,953,869 | 4/1976 | Wah Lo et al. ................ 396/326 |
| 3,967,300 | 6/1976 | Oshima . |
| 4,040,071 | 8/1977 | Shane . |
| 4,249,798 | 2/1981 | Moskovich . |
| 4,418,993 | 12/1983 | Lipton ............................... 352/57 |
| 4,462,025 | 7/1984 | Murakami et al. . |
| 4,597,659 | 7/1986 | Suda et al. . |
| 4,712,900 | 12/1987 | Hamano et al. . |
| 4,879,596 | 11/1989 | Miura et al. . |
| 5,504,547 | 4/1996 | Mikukawa . |
| 5,548,362 | 8/1996 | Wah Lo et al. . |

FOREIGN PATENT DOCUMENTS

| | | |
|---|---|---|
| 3415982 | 10/1985 | Germany . |
| 234599 | 2/1945 | Switzerland . |

Primary Examiner—David M. Gray
Attorney, Agent, or Firm—Fattibene and Fattibene; Paul A. Fattibene; Arthur T. Fattibene

[57] ABSTRACT

A stereo camera allows a rapid photographing and stereo effect correcting function to be compatible by providing a mechanism for automatically adjusting a distance between optical axes of photographing lenses and a manual adjusting mechanism. Lens shifting cams are provided symmetrically at a base frame of the stereo camera, and urged by a spring so that the inner surfaces of the lens shifting cams are pushed upon the right and left lens boards independent from each other. The lens shift cams are formed to automatically focus the photographing ranges of the right and left photographing lenses of a focal distance irrespective of the feeding amounts of the photographing lenses, and the distance between the optical axes are automatically adjusted being interlocked to the focal adjustment. If the subjects of remote range and close range are mixed, the manual adjusting lens shift knob is operated to move the lens boards in approaching direction by lens shifters to be finely adjusted to the optimum distance between the optical axes.

10 Claims, 12 Drawing Sheets

STEREO CAMERA

BACKGROUND OF THE INVENTION

The present invention relates to a stereo camera and, particularly, to a stereo camera having a mechanism for adjusting the distance between optical axes (principal axes) of two photographing lenses.

DESCRIPTION OF THE PRIOR ART

It is general that the distance between the optical axes of two photographing lenses is fixed in a stereo camera for simultaneously photographing two pictures by a pair of right and left photographing lenses. In the stereo camera of this kind that the distance between the optical axes is fixed, the positional deviation of a subject image at the right and left photographing pictures is increased by the parallax of the two photographing lenses as the subject distance approaches, and non-overlapping regions are increased at the outsides of the stereo photographing regions of the right and left photographing pictures. Since the non-overlapping regions become an eyesore when the photographing film is mounted in a stereo slide mount to appreciate it by a stereo slide viewer, it employs means for shielding the non-overlapping regions of the right and left pictures by selecting the stereo slide mount having a suitable window width by preparing a plurality of types of stereo slide mounts having different window widths. Accordingly, it is known that there is a disadvantage that the loss of the picture width is large and the shielding amount of the picture in the case of mounting and the lateral positional determination is not easy.

Therefore, the inventor of the present invention has already proposed a reflex-type stereo camera that the distance between the optical axes of two photographing lenses is adjustable, so that the parallel correction result can be visually recognized by a finder. In this stereo camera, the distance between the optical axes of the photographing lenses is so adjusted as to bring the collimation marks marked at the same positions of right and left focal plates into agreement each other to eliminate the non-overlapping portions of the right and left pictures, thereby forming a stereo slide having an optimum stereo effect without picture loss.

The inventor the present invention has also proposed a reflex-type stereo camera that a composite prism in which the outer one-half pictures of the photographing ranges of the right and left lenses are symmetrically inverted right side left to synthesize one erect image, so that the right and left pictures can be observed by one eye to improve the visibility. In this stereo camera, it is also proposed that a focal point regulating mechanism and a mechanism for adjusting the distance between the optical axes of photographing lenses are interlocked to automatically correct the parallel in response to the photographing distance.

Since the stereo camera having the above-mentioned focal point adjusting mechanism and the mechanism for automatically adjusting the distance between the optical axes being interlocked can automatically adjust the distance between the optical axes irrespective of the shooting distance, the loss of the stereo photographing regions can be reduced and the rapid snapshot is excellent. However, there are not almost the state that all subjects in the pictures are disposed at an equal distance, and the subjects of various distances are frequently mixed. Accordingly, if the main subject of remote distance is focused, the distance correction between the optical axes of the lenses becomes insufficient with respect to the subject of the close range within the same pictures. Thus, at the time of appreciating by a stereo slide viewer, the subject of the close distance is projected from the picture to this side to be seen unnatural. To correct it, at the time of mounting, the outer regions of the right and left pictures must be suitably masked.

On the other hand, in a stereo camera which can adjust the distance between the optical axes irrespective of the focal point adjustment, a photographer can take a picture by correcting the optimum parallax while observing the finder image, but the focal point adjustment and the adjustment of the distance between the optical axes must be separately conducted. In this case, at the time of taking a still life or a scene, there is no obstacle, but since it is deteriorated in rapid taking a picture, it is not adapted for a snapshot.

As described above, the stereo camera having the mechanism for adjusting the distance between the optical axes have a merit and a demerit according to the photographing object. However, it is inconvenient to carry two types of stereo cameras, and its expenses increase.

Therefore, there arises a technical problem to be solved to improve the convenience by providing the mechanism for automatically adjusting the distance between the optical axes, allowing the adjustment of the distance between the optical axes to be manually executed as required to cope with both the cases that the rapid taking is required and that the complete parallax correction is required by one stereo camera. The object of the present invention is to solve the above-mentioned technical problem.

SUMMARY OF THE INVENTION

In order to accomplish the above-mentioned object, the present invention provides a stereo camera of the reflex type comprising a camera body of the structure that two optical systems of a single-lens reflex camera bodies are integrated, two photographing lenses, a focal point adjusting mechanism for adjusting a focal point by interlocking a pair of lens boards for mounting said photographing lenses in parallel with the optical axis direction of the lenses, and a mechanism for adjusting the distance between the optical axes for adjusting the interval of said pair of lens boards, wherein lens shifting cams are symmetrically provided at a base frame for supporting said lens boards and said focal point adjusting mechanism so that cam surfaces thereof are faced, engaging portions brought into contact with said lens shifting cams are provided at said pair of lens boards, said pair of lens boards are urged by a spring in an interval increasing direction so that said engaging portions are pushed onto said lens shifting cams to constitute a mechanism for automatically adjusting the distance between the optical axes to bring the visual fields of right and left photographing lenses at a focal distance into agreement at all times irrespective of the feeding amounts of the photographing lenses by said lens shifting cams, an expanding and contracting mechanism for switching the interval of a pair of lens shifters by means such as a feed screw or the like is provided, said pair of lens boards are disposed between said pair of lens shifters to constitute a mechanism for manually adjusting the distance between the optical axes.

The invention further provides a stereo camera wherein a both eye finder unit having a pair of right and left pentaprisms mounted on a pair of right and left focal plates of said stereo camera and a single-lens finder unit having a composite prism for synthesizing one erect image by symmetrically inverting right side left the inner one-half pictures of the pair of right and left focal plates are formed to be interchanged.

DESCRIPTION OF THE PREFERRED EMBODIMENTS

Figure 1:
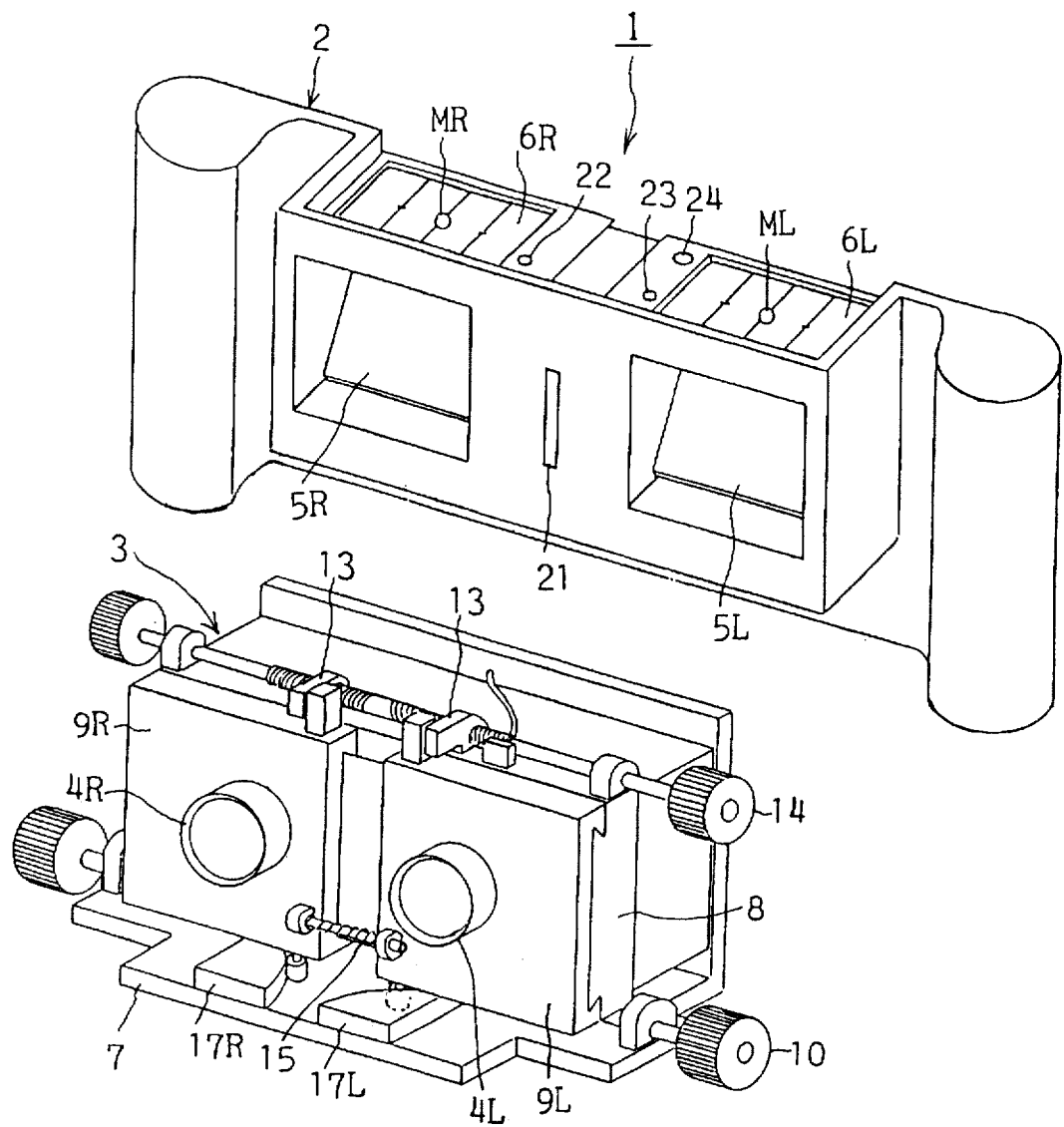
FIG. 1 is a perspective view of a body and a lens unit of a stereo camera according to the present invention.

Embodiments of the present invention will now be described in detail. FIG. 1 illustrates a camera body 2 and a detachable lens unit 3 of a stereo camera 1. The camera body has a structure that optical system mechanisms of two optical systems of single-lens reflex-type camera are integrally provided in parallel. 45-degree reflex mirrors 5R and 5L for reflecting upwards light rays incident through photographing lenses 4R and 4L of lens units 3 are arranged at the right and left sides, and a focal plane shutter (not shown) is disposed at the rear of the reflex mirrors 5R and 5L which turn in the vertical direction. Focal plates 6R and 6L are arranged above the reflect mirrors 5R and 5L, and finder units to be described later are mounted on the focal plates 6R and 6L.

Figure 2:
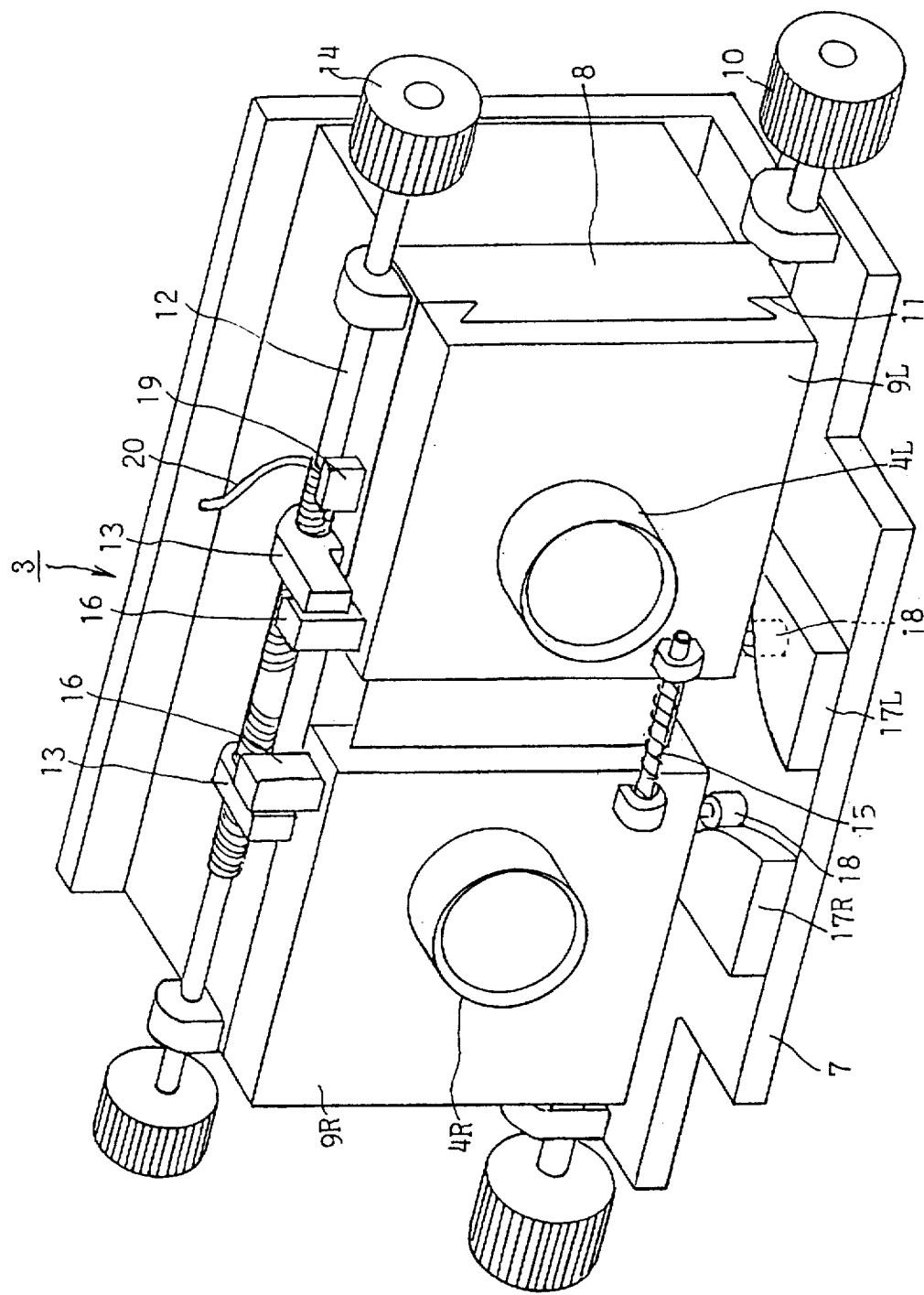
FIG. 2 is a perspective view of the lens unit.

Referring to FIG. 2, a box-shaped slide frame 8 is assembled in a base frame 7 of the lens unit 3 to slide back and forth, and right and left lens boards 9R and 9L are mounted in front of the slide frame 8. Upon turning of a focusing knob 10 mounted at the base frame 7, the slide frame 8 moves back and forth in parallel with the optical axes of the photographing lenses 4R and 4L by a known feeding mechanism (not shown) such as a cam or a rack and pinion mechanism or the like. The slide frame 8 may be guided by engaging with a guide formed on the base frame 7 or engaging with a guide rail bush by mounting the guide rail on the base frame 7 and mounting the bush in the slide frame 8. The rear vertical surface of the base frame 7 and the slide frame 8 are coupled by a slide expansion tube structure or bellows to be so formed as not to leak external light to the inner space of the slide frame 8.

The slide frame 8 and the lens boards 9R and 9L are coupled by dovetail type guide mechanism 11, and the lens boards 9R and 9L are slidable in an optical axis perpendicular direction. A lens shifting shaft 12 mounted on the upper surface of the slide frame 8 in the optical axis perpendicular direction is symmetrically formed from the center with a right hand screw and a left hand screw, lens shifters 13 formed with internal threads mesh with the right and screw and the left hand screw. When a lens shift knob 14 of the lens shifting shaft 12 is turned, the lens shifter 13 are symmetrically approached or separated in response to the turning direction.

Compression coiled springs 15 are disposed at the right and left lens boards 9R and 9L to urge the right and left lens boards 9R and 9L in an expanding direction, and arms 16 provided on the upper surfaces of the right and left lens boards 9R and 9L are faced to the inner sides of the lens shifters 13.

Platelike lens shifting cams 17R and 17B are mounted symmetrically in front of the base frame 7 to urge rollers 18 provided under the lens boards 9R and 9L so that the rollers 18 are pushed upon the lens shifting cams 17R and 17B by the operation of the lens shift knob 14. That is, when the lens shift knob 14 is turned in the direction for separating the lens boards 9R and 9L, the lens boards 9R and 9L move outwards by the compression coiled spring 15, so that the rollers 18 urge the lens shifting cams 17R and 17L, and the lens shifters 13 further move outwards to separate from the arms of the lens boards 9R and 9L.

When the lens shift knob 14 is reversely rotated, the lens shifters 13 press the arms 16 from the outside to move the lens boards 9R and 9L in approaching direction, and the rollers 14 are separated from the lens shifting cams 17R and 17L.

Figure 3:
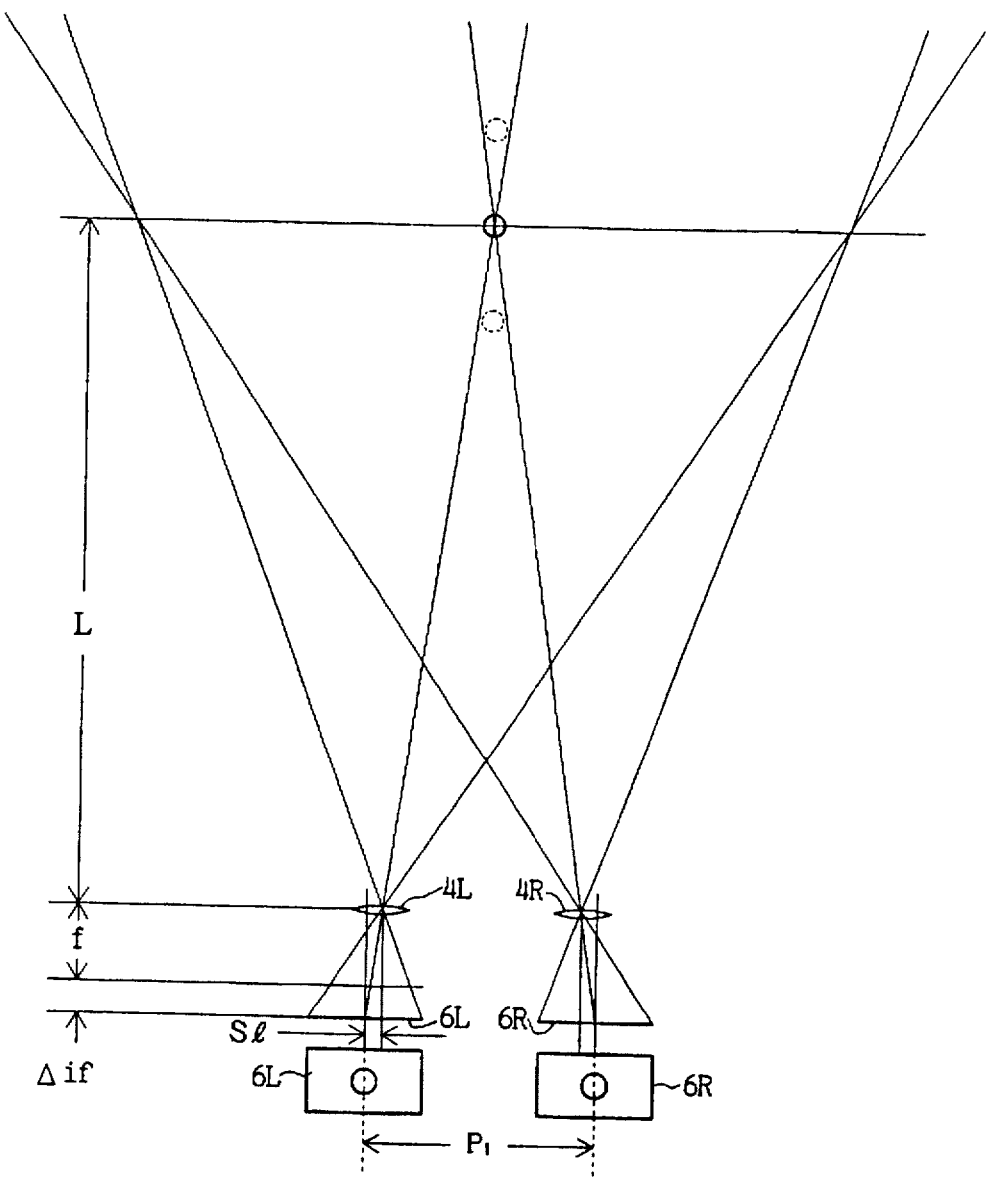
FIG. 3 is a diagram illustrating a relationship between the focal point of a photographing lens and a distance between optical axes at the time of correcting a parallax.

The lens shifting cams 17R and 17L are so formed that the photographing ranges of the right and left photographing lenses 4R and 4L at a focal distance bring into agreement irrespective of the feeding amounts of the photographing lenses 4R and 4L. FIG. 3 illustrates a relationship between the focal point of the photographing lens and the distance between the optical axes. Let it new be presumed that a piece of thin lens is employed and that:

| | |
|---|---|
| Focal distance of the lens ... | f |
| Distance from the subject to the principal point of the lens ... | L |
| Distance from the focal point of the lens to the image-forming position ... | if |

Then, there holds if=$f^2$/L−f and, hence, the distance between the principal point of the lens to the surface of the film becomes f+if.

Moreover, if the pitch between the right and left exposing surfaces of the stereo camera is $P_1$, the shifting amount S1 of the right and left lenses for bringing the right and left photographing ranges into agreement is given by, $$S1=(P_1/2)\times(f+if/L+f+if).$$

That is, the right and left lenses may be moved in a direction to approach each other by a shifting amount S1 calculated from the above equation with a decrease from the subject to the principal point of the lens.

The lens shifting cams 17R and 17L shown in FIG. 2 are formed in the shape based on the above-mentioned equation, the photographing lenses 4R and 4L are disposed at the focal position at infinity by the focusing knob 10, the lens shift knob 14 is turned in the direction that the lens boards 9R and 9R separate. When the rollers 18 are urged to the lens shifting cams 17R and 17B to separate the lens shifters 13 from the arms 16, it becomes the state for automatically adjusting the distance between the optical axes.

In this state, the optical axis interval of the photographing lenses 4R and 4L is varied along the cam surfaces of the lens shifting cams 17R and 17L being interlocked together with the adjustment of the focal point by the focusing knob 10, so that the photographing ranges of the right and left photographing lenses 4R and 4L of the focal distance bring into agreement at all times. The pitch of the right and left exposed pictures and the pitch of the maximum optical axes of the photographing lenses 4R and 4L are desired to be about 63.5 mm of the interval between both human eyes. The camera body 2 can be interchanged by an arbitrary lens unit by forming the lens unit having various focal distances by designing the shapes of the lens shifting cams 17R and 17L to bring into agreement with the focal distance of the photographing lens.

When a single-lens finder unit to be described later is mounted and the deviation of right and left one-half images of the finder to adjust a focal point, it is necessary to adjust the focal point in the state for automatically adjusting the distance between the optical axes, but to display an alarm when the lens shifters 13 push the arms 16 so that the rollers 18 are separated from the lens shifting cams 17R and 17L in the state for manually adjusting the distance between the optical axes, a microswitch 19 is mounted at the outside of the movable range of the one arm 16 of the upper surface of the slide frame 8. When the lens shifter 13 is moved to the outer position where the lens shifter 13 is not contacted with the arm 16 even at the focal position at infinity, the lens shifter 13 pushes the pushbutton of the microswitch 19 to detect the state for automatically adjusting the distance between the optical axes.

The electrodes of the microswitch 19 are connected to the contacts (not shown) on the back surface of the base frame 7 via lead wires 20. Referring to FIG. 1, a contact 21 corresponding to the contact of the lens unit 3 is provided at the center of the front surface of the camera body 2. When the lens unit 3 is mounted at the camera body 2, the microswitch 19 is connected to a controller of the camera body 2. A photometric contact 22 connected to a photometric element of the finder unit, a finder unit detecting contact 23 for identifying the kind of the finder unit to be described later and a light emitting element 234 for displaying an alarm are disposed near the inner edges of the focal plates 6R and 6L of the camera body 2.

Figure 4:
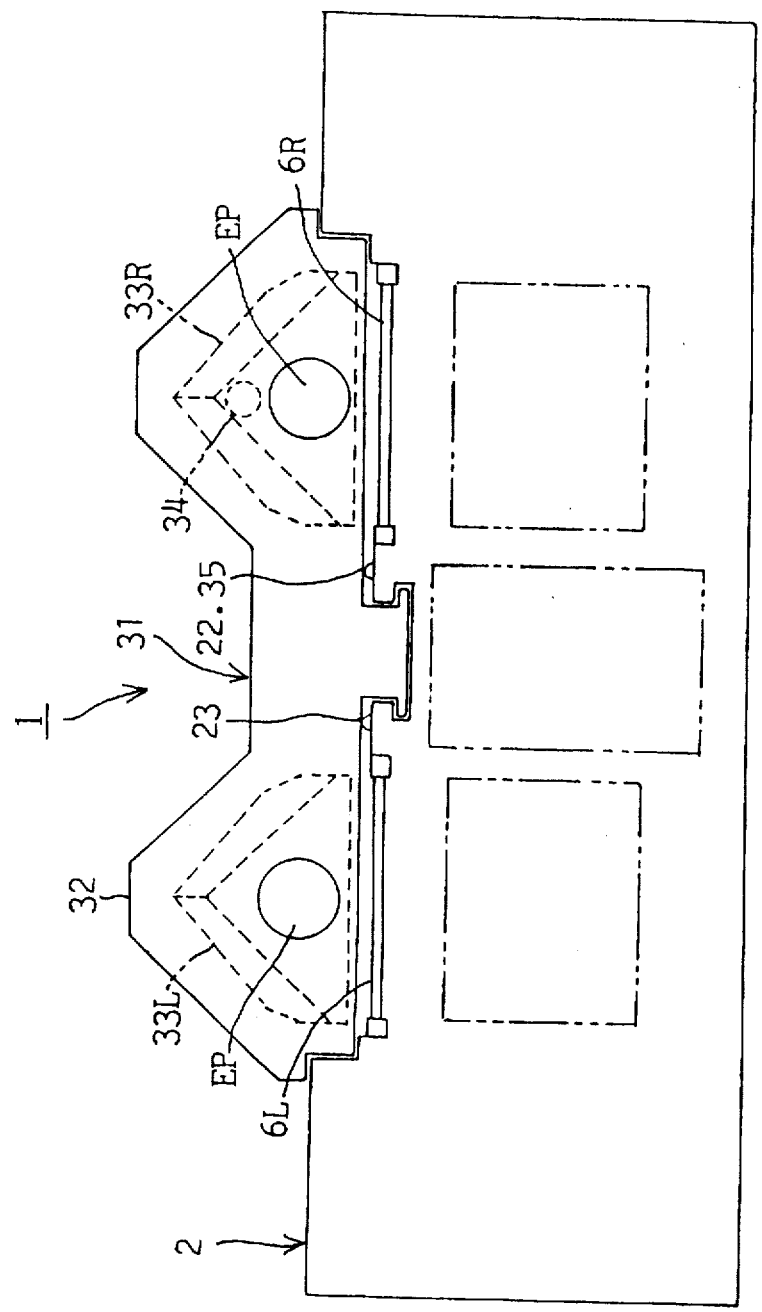
FIG. 4 is a diagram illustrating a stereo camera mounting a binocular finder unit.

Referring to FIG. 4, a stereo camera 1 mounting a binocular finder unit 31 of one of two type of finder units is illustrated. The binocular finder unit 31 has pentaprisms 33R and 33L corresponding to the focal plates 6R and 6L of the camera body 2 assembled in a unit cover 32. The photometric element 34 is assembled in one pentaprism 33. The contact 35 of the photometric element 34 is contacted with the photometric contact 22 of the camera body 2. A controller controls a shutter speed or an automatic diaphragm of the photographing lens or the both to give suitable exposure amount to a photographing film to constitute a known automatic exposure mechanism A contact corresponding to the finder unit detecting contact 23 of the camera body 2 is not provided in the binocular finder unit 31. When the binocular finder unit 31 is mounted, the state of the finder unit detecting contact 23 is open.

The light rays incident upon the photographing lenses 4R and 4L form images on the focal plates 6R and 6L through reflex mirrors 5R and 5L, and erect images inverted from the images inverted right side left on the focal plates 6R and 6L by the pentaprisms 33R and 33L can be observed through right and left eyepieces ep. Referring to FIG. 1, the focal plates 6R and 6L are marked by collimation marks MR and ML having three vertical lines at the center and right and left sides and a circular pattern of the central position. When the focuses of the photographing lenses 4L and 4R are focused at infinity, the photographing lenses 4R and 4L are directed toward an infinity in the state for automatically adjusting the distance between the optical axes to separate the lens shifters 13 from the arms 16 by moving outwards as described above, and both the right and left finder images are viewed by both eyes, the collimation marks MR and ML of the right and left focal plates 6R and 6L are observed to bring into agreement as shown by FIG. 5(a).

When the focusing knob 10 is turned to feed the photographing lenses 4R and 4L, the photographing lenses 4R and 4L are shifted in approaching direction along the lens shifting cams 17R and 17L, so that the right and left photographing ranges automatically bring into agreement irrespective of the photographing distance. Accordingly, the parallaxes of the photographing lenses 4R and 4L for the subject are automatically corrected irrespective of the photographing distance, so that the subject of the focal position is photographed at the same position on the right and left pictures. Thus, it is not almost necessary to correct the parallax by adjusting the film pitch in the case of mounting the film in the stereo slide mount. Since the non-overlapping portions of the right and left pictures to be shielded by the windows of the slide mount are reduced, the stereo side having small picture losses can be formed.

Figure 5:
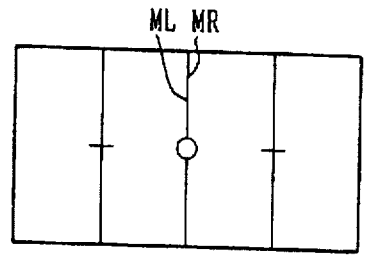
FIG. 5 illustrates a binocular parallax of a focal plate by a binocular finder unit, wherein FIG. 5($a$) illustrates the suitable state of the distance between the optical axes, and FIG. 5($b$) is a diagram illustrating the improper state of the distance between the optical axes.
Figure 5:
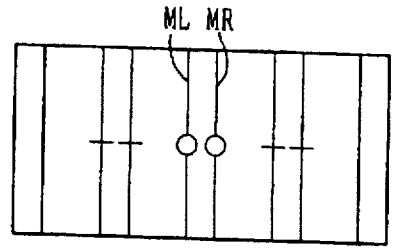
Figure 6:
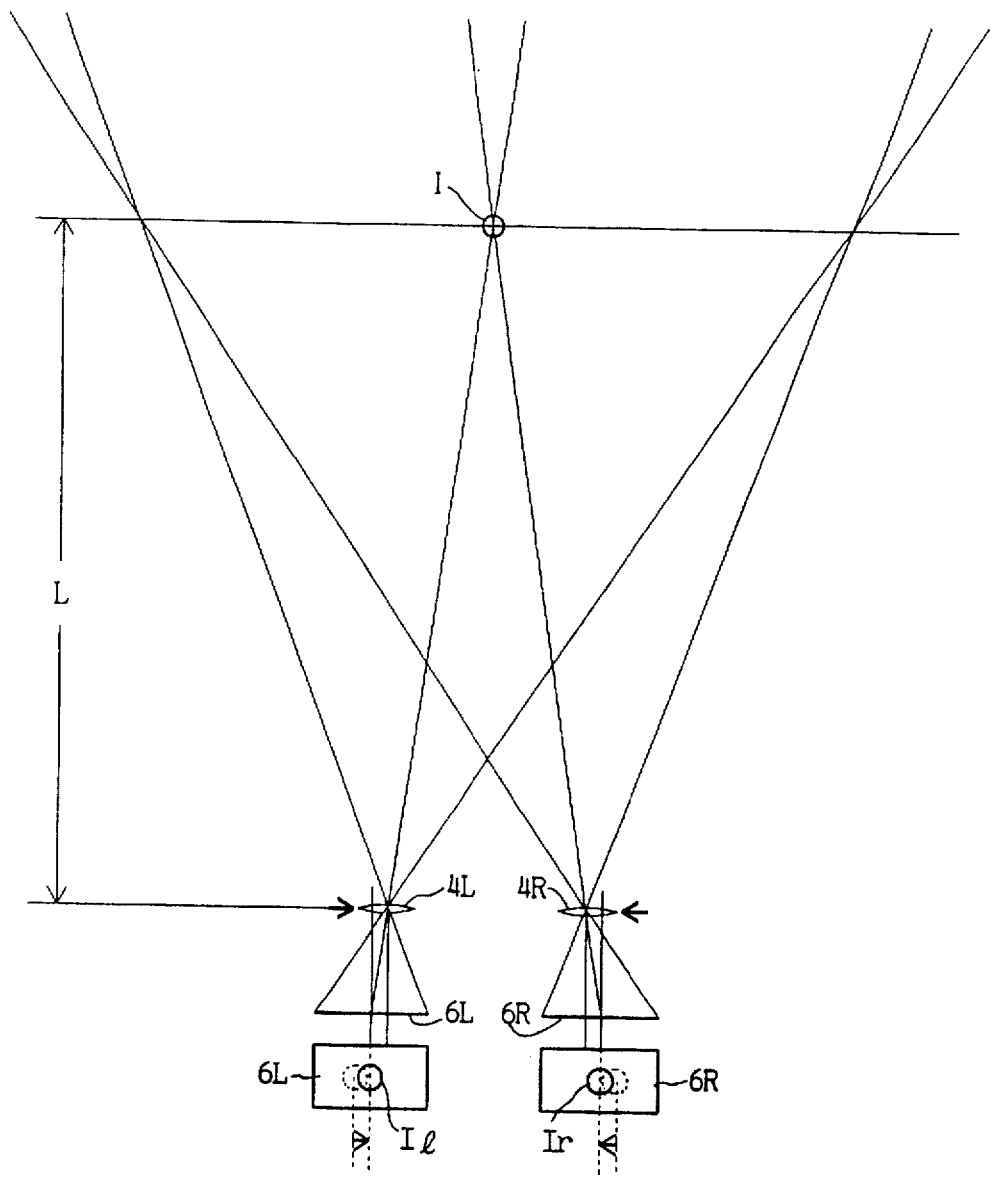
FIG. 6 is a diagram illustrating an image shift by the adjustment of the distance between the optical axes.

However, if the subjects exist at different distances in the pictures, when the focal point is focused at the remote subject, the relative positions between the subject in a close range view and collimation marks MR, ML are difference at the right and left focal plates 6R and 6L, and, hence, the right and left collimation marks MR and MR do not bring into agreement but are seen double as shown in FIG. 5(b) according to the human collimation noted at the subject of a close range view. In this case, when the lens shift knob 14 is turned to contract the distance between the optical axes of the photographing lenses 4R and 4L, as shown in FIG. 6, the subjects IR an IL in close range view move in approaching direction at the right and left focal plates 6R and 6L, and the subjects IR and IL in close range view reversely move in separating direction from focal plate images in an erect finder image inverted right side left by the pentaprisms 33R and 33L. The parallaxes of the collimation marks MR and ML of the focal plates 6R and 6L are corrected, as shown in FIG. 5(a), it reaches a point where the collimation marks MR and ML bring into agreement, and the visual fields of the photographing lenses 4R and 4L almost bring into agreement at the distance of the subjects in close range view.

In the case of the manual adjustment of the distance between the optical axes, it is visually recognized that the relative back and forth position of the subject to the collimation marks MR and ML is varied in response to the shifting amount in the lens shifting range where the collimation marks MR and ML of the focal plates 6R and 6L bring into agreement. An excellent stereo effect is obtained within the lens shifting range where the collimation marks MR and ML bring into agreement irrespective of the shifting amount, but except the case where a special effect to fly out the subject in close range view from the picture to this side is intended, if it is so adjusted that the entire subject is observed remotely from the collimation marks MR and ML which bring into agreement. the stereo image of the subject in near range view is not focused at a close distance in the case of appreciating by a stereo slide viewer, but the stereo slide of natural stereo effect is obtained.

When the stereo side photographed as described above is mounted in the stereo slide mount, the parallax is corrected in the best state for the subject in the right and left pictures, and. hence. it is not necessary to shield the non-overlapping portions, but the stereo slide mount having almost the same size of the window as the real picture size can be used, and hence. the picture loss can be eliminated.

When the slides are mounted in the stereo slide mount, if the slides are mounted at reference positions where the right and left centers of the window of the stereo slide mount bring into agreement with the right and left centers of the slides. the stereo effect confirmed by the finder at the time of photographing is obtained, and it is not necessary to adjust the mounting position of the slide in response to the photographing distance of the subject.

Figure 7:
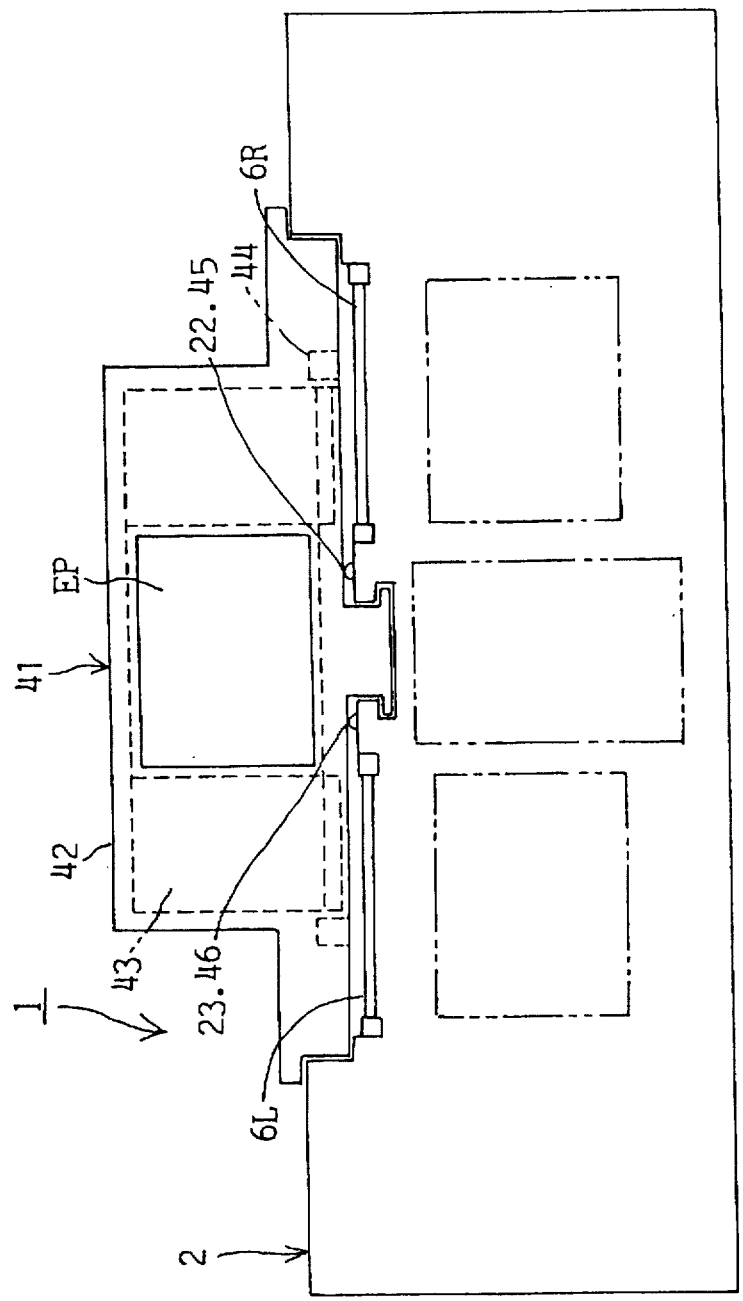
FIG. 7 is a diagram illustrating a stereo camera mounting a single-lens finder unit.

Referring to FIG. 7, the stereo camera 1 mounting a single-lens finder unit 41 is illustrated. A composite prism 43 assembled in a unit cover 42 is a prism for synthesizing one erect image by symmetrically inverting right side left the outer one-half picture in the photographing ranges of the right and left lenses of the stereo camera already proposed by the inventor of the present invention.

The single-lens finder unit 41 has a photometric element 4 at the side of the composite prism 43, and a contact 45 of the photometric element 44 is contacted with the contact 22 of the camera body 2. Further, a contact 46 which is contacted with the finder unit detecting contact 23 of the camera body 2 is provided.

Figure 8:
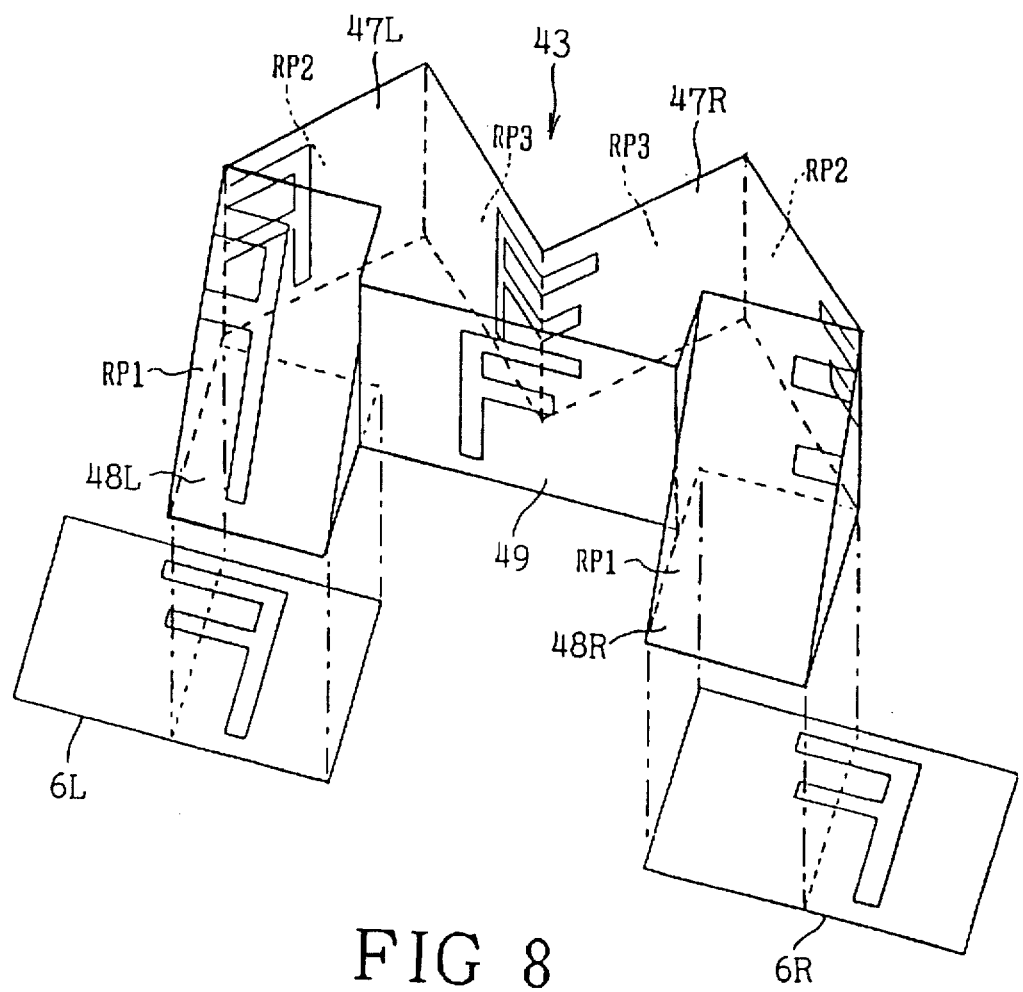
FIG. 8 is a perspective view of a composite prism.

The composite prism 43 is made of an optical resin or an optical glass and comprises two total reflection prisms formed symmetrically as a unitary structure. Referring to FIG. 8, 90-degree reflection prism units 47R and 47L for introducing the light rays from the lower direction are joined to the outer one-half portions of the planes of incidence of the two 180-degree reflection prism units 47R and 47L that are joined in parallel. The inner one-half portions of the 180-degree reflection prism units 47R and 47L constitute a continuous projection plate 49.

Figure 9:
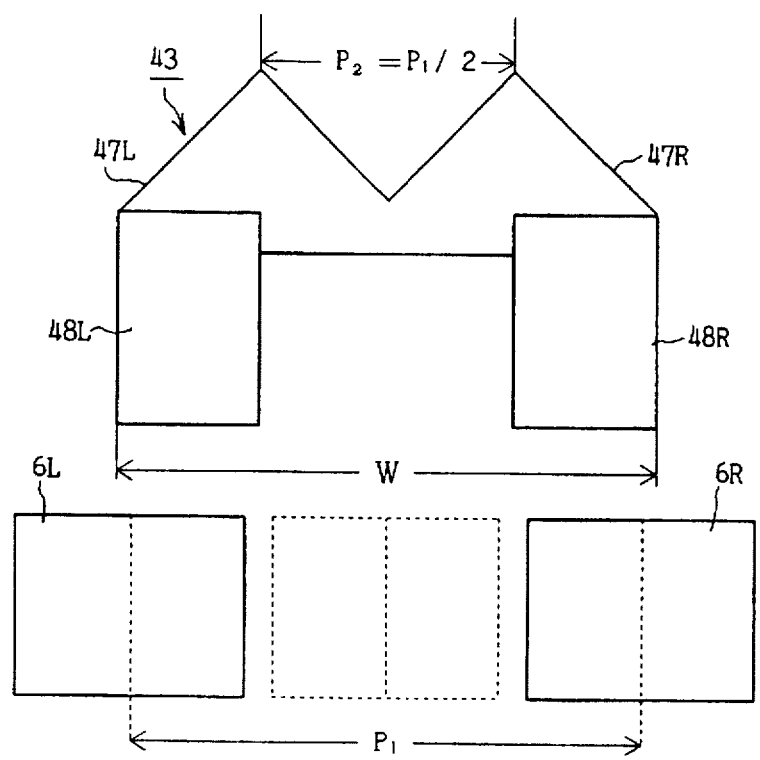
FIG. 9 is a diagram illustrating a relationship between the size of the composite prism and the pitch of the focal plates.

Referring to FIG. 9, the pitch $P_2$ between the vertexes of the 180-degree reflection units 47R and 47L of the composite prism 43 is one-half the pitch $P_1$ between the centers of the right and left exposed pictures, and the total width W is slightly broader than the pitch $P_1$ of the pictures.

Referring to FIG. 8, the composite prim 43 is such that the planes of incidence of the right and left 90-degree total reflection prism units 48L and 48R are arranged on the right and left focal plates being faced to the inner one-half regions of the focal plates 6R and 6L, so that the light rays incident on the 90-degree reflection prism units 48R and 48L from the lower direction are totally reflected three times and go out in the horizontal direction from the projection plate 49.

The upside down and right side left inverted images that have passed through the lenses 4R and 4L are inverted upside down by the reflex mirrors 5R and 5L, and erect right side left inverted images are formed on the focal plates 6R and 6L. Images of the inner one-half portions of the right and left focal plates 6R and 6L are symmetrically inverted right side left, i.e., the outer one-half portions of the photographing ranges of the right and left lenses 4R and 4L are symmetrically inverted right side left by the prism 11. Therefore, the erect image of the outer one-half portion in the photographing range of the left lens 4L is projected onto the left one-half portion of the projection plane 49 of the prism 43, and the erect image of the outer one-half portion in the photographing range of the right lens 4R is projected onto the right one-half of the projection plane 49 thereby to synthesize a picture. The focal plates 6R and 6L need not have the same size as the picture but may have a size which is equal to, or slightly larger than, that of the plane of the incidence of the prism which has a size nearly one-half the size of the picture.

Figure 10:
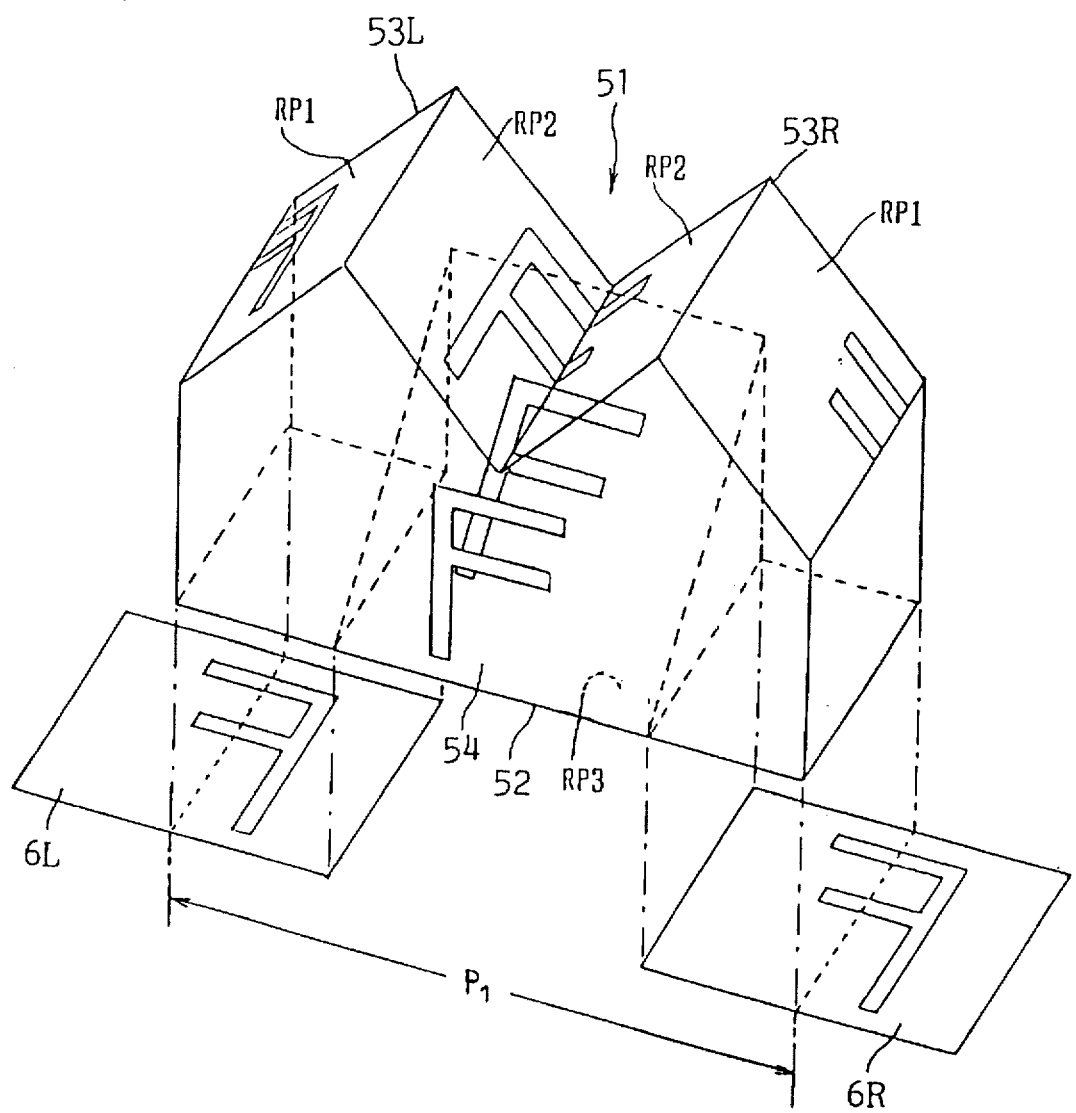
FIG. 10 is a perspective view showing another embodiment of the composite prism.

FIG. 10 illustrates another embodiment of the composite prism of a single-lens finder unit. Contrary to the prism 43 known in FIG. 7, this composite prism 51 has the inner one-half portions of the projection planes of the 180-degree reflection prism units 53R and 53L joined to the right and left one-half portions of the central 90-degree reflection prism unit 52. Like the prism 43 shown in FIG. 7, the light rays are totally reflected three times. The pitch between the vertexes of the 180-degree reflection prism units 53R and 53L, and the total width, are the same as those of the prism 43.

When the above-described single-lens finder unit 41 is mounted, the lens unit 3 is set to the state for automatically adjusting the distance between the optical axes, and, hence, the focus adjusted state can be determined by the deviation of the finder image of the lateral one-half portion except the case that the focal point adjusted state is visually recognized by the images of the focal plates 6R and 6L, and the focal point adjustment can be easily conducted even in dark photographing environment.

Figure 11:
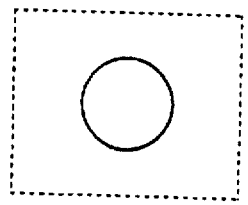
FIG. 11($a$) is a diagram illustrating a subject, and FIGS. 11($b$), 11($c$) and 11($d$) are diagrams illustrating the finder images of the subjects according to the single-lens finder unit.
Figure 11:
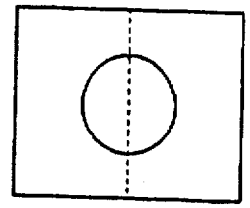
Figure 11:
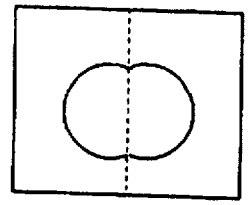
Figure 11:
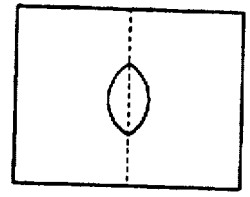

Referring to FIG. 11(a), a subject is illustrated, and referring to FIGS. 11(b), 11(c) and 11(d), the finder images of a single-lens finder unit 41 are illustrated. When the stereo camera is turned in the horizontal direction and the subject shown in FIG. 11(a) is disposed at the center of the picture, if the subject is focused, the subject disposed at the intersection of the right and left lens visual fields is seen in a real shape as shown in FIG. 11(b).

When the subject is disposed at remote distance from the focused position, i.e., at remote distance from the intersection of the right and left lens visual fields, the subject is seen as shown by FIG. 11(c), and when the subject is disposed further remotely, the subject is observed to be double images separate to the right and left sides. On the other hand, when the subject is disposed at the close range from the intersection of the right and left lens visual fields, the portion at the dead angle of the center is masked, and seen by a narrow width as shown in FIG. 11(d). In this manner, the focusing knob 10 is so rotated that the subject in the finder picture is seen in real shape, thereby focusing the picture.

Depending upon the subject, furthermore, the parallax may not be easily corrected and the focal point may not be easily adjusted. When the subject is a vertical line or a horizontal line, in particular, it may be difficult to determine the state of focus and parallax. In such a case, the stereo camera should be tilted from the horizontal state toward either rightwards or leftwards to easily make sure the state where the focal point is adjusted.

When the right and left lenses 4R and 4L of the stereo camera 1 are focused at infinity, the optical axes are disposed at the centers of the right and left exposed pictures. When the single-lens finder unit 41 is mounted, the finder image synthesized by the outer one-half of the visual fields of the right and left lenses 4R and 4L is seen, and, hence the central region directed toward the centers of the right and left photographing ranges by the width equal to the pitch of the optical axes of the lenses 4R and 4L is out of the visual field. However, the range which cannot be seen by eyes is a very narrow linear portion, and there is almost no subject to be concealed within this range. When the stereo camera is deflected in the horizontal direction, the entire subject of all the photographing ranges can be seen, and, hence, there is no inconvenience in taking a picture.

When the single-lens finder unit 41 is mounted to be photographed in the state for automatically adjusting the distance between the optical axes, the parallax is automatically corrected being interlocked to the focal adjustment, and, hence, almost no non-overlapping portion exists on the right and left pictures, but when the subject at the remote distance is focused and photographed in the state that the parallax correction at the subject in the close range view is insufficient, it must need to correct the parallax by masking the outsides of the right and left photographing films at the time of mounting similarly to the conventional one. However, as compared with the general stereo camera having no mechanism for adjusting the distance between the optical axes, the area of the non-overlapping portions of the right and left pictures is remarkably reduced, and, hence, the stereo slide having very small picture loss can be obtained.

When the single-lens finder unit 41 for adjusting the focal point by the deviation of the lateral one-half image of the finder picture is mounted, if the distance between the optical axes of the photographing lenses 4R and 4L is manually corrected, even if the same focal point position is obtained by the variation of the parallax of the right and left pictures, the deviation of the lateral one-half image is varied, and the focal point adjustment becomes impossible to the the deviation of the image, and, hence it is necessary to set the state for automatically adjusting the distance between the optical axes. Accordingly, if it erroneously becomes the state for manually adjusting the distance between the optical axes at the time of mounting the single-lens finder unit 41, it is desired to display an alarm by any means.

Figure 12:
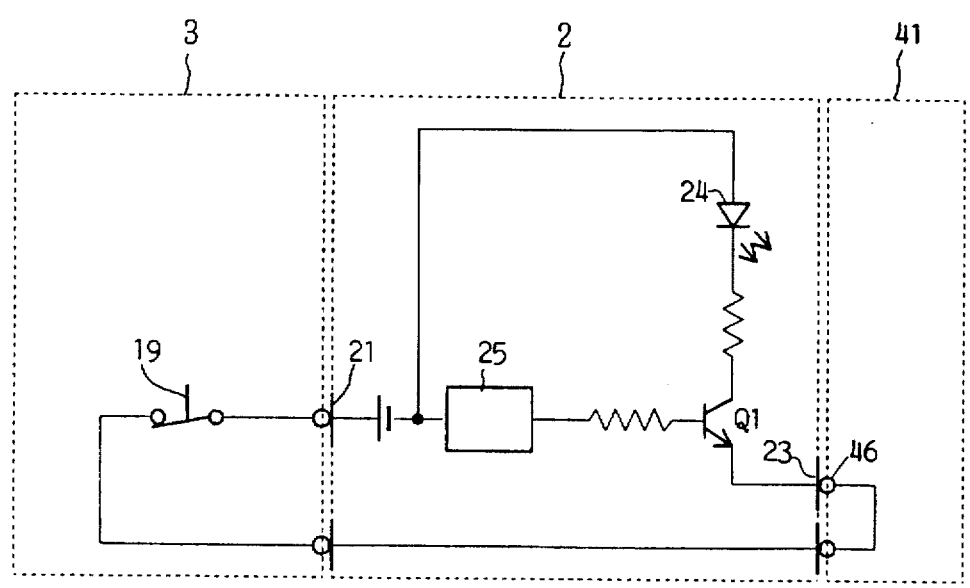
FIG. 12 is a circuit diagram of an alarm displaying circuit.

Referring to FIG. 12, an embodiment of an alarm displaying circuit is illustrated. When the single-lens finder unit 41 is mounted at the camera body 2, the contact 46 of the single-lens finder unit 41 is contacted with the finder unit detecting contact 23 of the camera body 2. The microswitch 19 of the above-mentioned lens unit 3 is normally closed, an emitter of a transistor Q1 for driving an LED 24 of a light emitting element is connected to (−) power through a body earth line in the state for manually adjusting the distance between the optical axes at the time of mounting the single-lens finder unit 41, i.e., the ON state that the push-button of the microswitch 19 is not pressed. Accordingly, the alarm displaying circuit is energized, a free running multivibrator 25 is started, the transistor Q1 is driven, the LED 24 is flashed for a predetermined time interval to warn the user of the state for manually adjusting the distance between the optical axes.

On the other hand, referring to FIG. 4, since a contact corresponding to the finder unit detecting contact 23 is not provided at a binocular finder unit 31, the LED 24 is not lit irrespective of the state for adjusting the distance between the optical axes at the time of mounting the binucolar finer unit 31, and the automatic and manual states can be arbitrarily switched to be photographed. The LED 24 is not, of course, lit in the state that the finder units 31 and 41 are not mounted at the camera body 2.

The present invention is in no way limited to the above-mentioned embodiments only but can be modified in a variety of ways within the technical scope of the invention, and it should be noted that the present invention emcompasses such modified embodiments, as a matter of course.

With the stereo camera of the present invention as described above in detail, the mechanism for automatically adjusting the distance between the optical axes of the lenses interlocked to the focal adjustment is provided, and the manual adjustment of the distance between the optical axes is also performed. Accordingly, when the mechanism for automatically adjusting the distance between the optical axes is used, the photographing ranges of the right and left lenses at the focal distance bring into agreement only by the focal adjustment, the right and left parallaxes of the subject of the focused distance is corrected to the suitable state, and the non-overlapping regions of the right and left pictures, i.e., photographed in the state the picture losses of the stereo photograph is suppressed.

When the remote subject and the subject of close range are existed, the manual adjustment of the distance between the optical axes is conducted, and photographed in the best corrected state while confirming the effect of the parallax correction by the adjustment of the distance between the optical axes by the binocular finder unit. Therefore, the above-mentioned functions are used in response to the state, and a stereo photograph of high quality level can be easily taken to contribute to the prevail of the stereo photographs.

I claim:

1. A stereo camera of the reflex type comprising a camera body of the structure that two optical systems of a single-lens reflex camera bodies are integrated, two photographing lenses, a focal point adjusting mechanism for adjusting a focal point by interlocking a pair of lens boards for mounting said photographing lenses in parallel with the optical axis direction of the lenses, and a mechanism for adjusting the distance between the optical axes for adjusting the interval of said pair of lens boards, wherein lens shifting cams are symmetrically provided at a base frame for supporting said lens boards and said focal point adjusting mechanism so that cam surfaces thereof are faced, engaging portions brought into contact with said lens shifting cams are provided at said pair of lens boards, said pair of lens boards are urged by a spring in an interval increasing direction so that said engaging portions are pushed onto said lens shifting cams to constitute a mechanism for automatically adjusting the distance between the optical axes to bring the visual fields of right and left photographing lenses at a focal distance into agreement at all times irrespective of the feeding amounts of the photographing lenses by said lens shifting cams, an expanding and contracting mechanism for switching the interval of a pair of lens shifters by means such as a feed screw or the like is provided, said pair of lens boards are disposed between said pair of lens shifters to constitute a mechanism for manually adjusting the distance between the optical axes.

2. A stereo camera according to claim 1, wherein a both eye finder unit having a pair of right and left pentaprisms mounted on a pair of right and left focal plates of said stereo camera and a single-lens finder unit having a composite prism for synthesizing one erect image by symmetrically inverting right side left the inner one-half pictures of the pair of right and left focal plates are formed to be interchanged.

3. A stereo camera of the reflex type comprising:

a camera body;

a first lens board;

a first photographing lens having a first optical axis mounted on said lens board;

a second lens board;

a second photographing lens having a second optical axis mounted on said lens board;

a focal point adjusting means, coupled to said first and second lens boards, for adjusting a focus of said first and second photographing lenses;

a first roller moving with said first lens board;

a second roller moving with said second lens board;

a first lens shifting cam contacting said first roller;

a second lens shifting cam contacting said second roller, said first and second lens shifting cams shaped and positioned to adjust a distance between the first and second optical axes as a function of focus position of said first and second photographing lenses;

biasing means, coupled to said first and second lens boards, for biasing said first and second rollers into contact with said first and second lens shifting cams;

manual adjusting means, coupled to said first and second lens boards, for manually adjusting the distance between the first and second optical axes irrespective of the focus of said first and second photographing lenses, whereby a photographer may make a complete parallax correction as required to provide an improved stereo image.

4. A stereo camera as in claim 3 further comprising:

an interchangeable finder unit.

5. A stereo camera as in claim 4 wherein:

said interchangeable finder unit comprises a binocular finder unit.

6. A stereo camera as in claim 4 wherein:

said interchangeable finder unit comprises a single lens finder unit.

7. A stereo camera as in claim 5 further comprising:

a first focal plate associated with said first photographing lens;

a second focal plate associated with said second photographing lens; and collimation marks associated with said first and second focal plate.

8. A stereo camera as in claim 4 further comprising:

a first focal plate associated with said first photographing lens;

a second focal plate associated with said second photographing lens; and wherein said single lens finder unit comprises a plurality of prisms for synthesizing one erect image by symmetrically inverting one-half images on said first and second focal plate.

9. A stereo camera as in claim 3 wherein:

said manual adjusting means comprises a shaft having a right hand screw and a left hand screw; a first lens shifter threaded onto said right hand screw and a second lens shifter threaded on said left hand screw; a first arm attached to said first lens board; and a second arm attached to said second lens board; and a knob attached to said shaft, wherein when said knob is rotated the distance between the first and second optical axes is manually adjusted.

10. A stereo camera of the reflex type comprising:

a camera body adapted to receive interchangeable finders;

a first lens board;

a first photographing lens having a first optical axis mounted on said lens board;

a second lens board;

a second photographing lens having a second optical axis mounted on said lens board;

a focal point adjusting means, coupled to said first and second lens boards, for adjusting a focus of said first and second photographing lenses;

a first roller moving with said first lens board;

a second roller moving with said second lens board;

a first lens shifting cam contacting said first roller;

a second lens shifting cam contacting said second roller, said first and second lens shifting cams shaped and positioned to adjust the distance between the first and second optical axes as a function of focus position of said first and second photographing lenses;

biasing means, coupled to said first and second lens boards, for biasing said first and second rollers into contact with said first and second lens shifting cams;

manual adjusting means, coupled to said first and second lens boards, for manually adjusting the distance between the first and second optical axes irrespective of the focus of said first and second photographing lenses;

a single lens finder unit adapted to attach to said camera body;

a binocular lens finder unit adapted to attach to said camera body and interchangeable with said single lens finder unit;

finder unit detector means, associated with said camera body, for detecting the finder unit attached to said camera body;

display means for displaying an alarm when said single lens finder unit is attached to said camera and said first and second rollers are separated from said first and second lens shifting cams, whereby a photographer may take quick snapshots in an automatic mode, or make slower manual adjustments to correct for parallax providing an improved stereo image.

* * * * *